Figure 1:
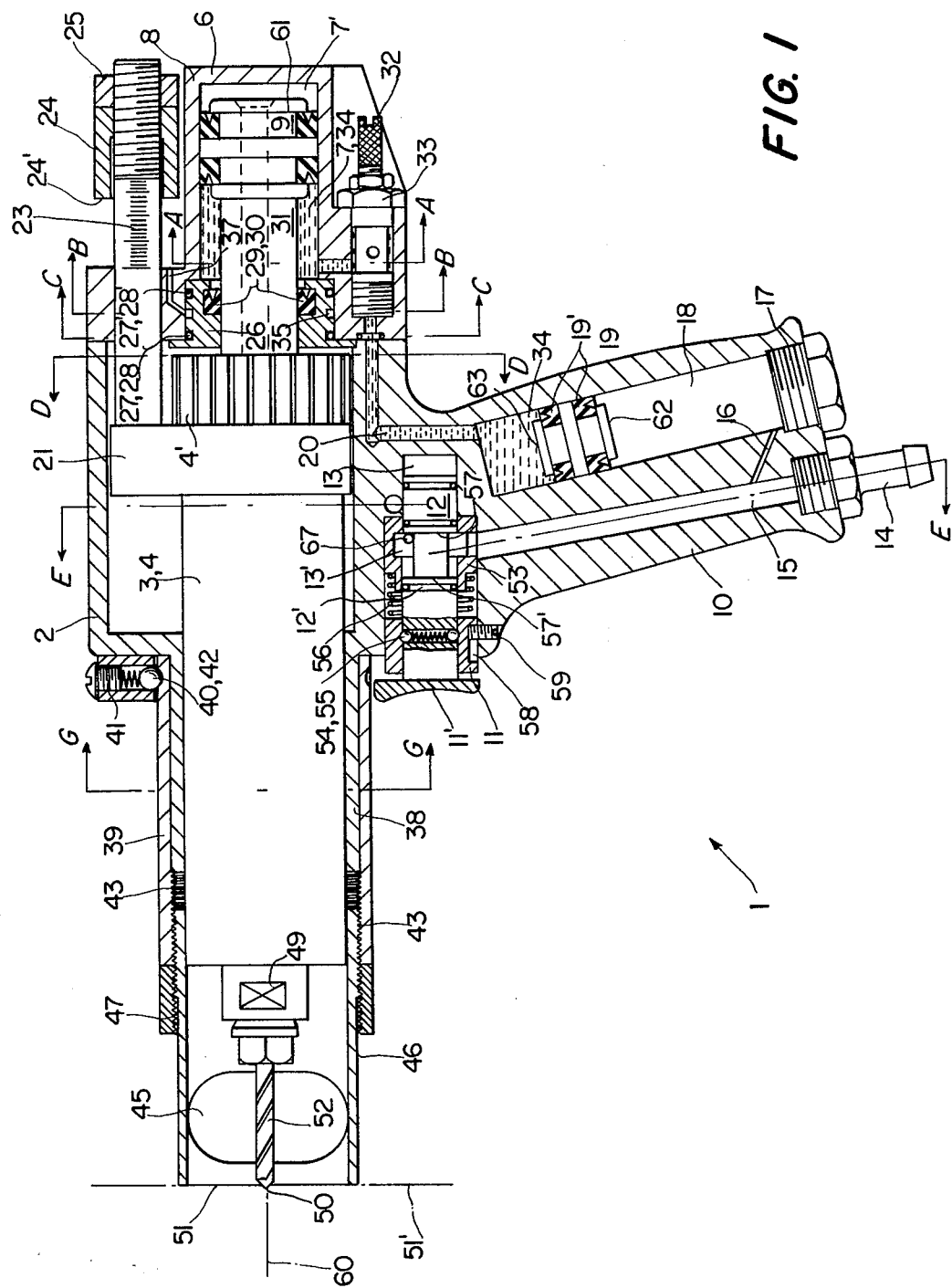

United States Patent [19]

Pönitzsch et al.

[11] 4,329,092
[45] May 11, 1982

[54] HAND DRILL

[75] Inventors: Werner Pönitzsch, Friedrichshafen; Helmut Reccius, Munich; Herbert Fehlings, Eltville, all of Fed. Rep. of Germany

[73] Assignee: Dornier GmbH, Fed. Rep. of Germany

[21] Appl. No.: 125,862

[22] Filed: Feb. 29, 1980

[30] Foreign Application Priority Data

Mar. 1, 1979 [DE] Fed. Rep. of Germany ....... 2907913

[51] Int. Cl.³ .................... B23B 39/10; B23B 47/22
[52] U.S. Cl. .................................. 408/11; 408/10; 408/14; 408/130
[58] Field of Search ............... 408/11, 14, 97, 12, 408/10, 130; 409/80; 81/429; 10/139 R

[56] References Cited

U.S. PATENT DOCUMENTS

| | | | |
|---|---|---|---|
| 2,604,759 | 7/1952 | Smith | 408/14 X |
| 2,869,403 | 1/1959 | Bent | 408/14 |
| 3,238,821 | 3/1966 | Coulter | 408/11 |
| 3,301,333 | 1/1967 | Unsker | 408/11 X |
| 3,487,729 | 1/1970 | Juhasz et al. | 408/14 |
| 3,526,158 | 9/1970 | Adams et al. | 408/97 |
| 3,598,497 | 8/1971 | Nyman | 408/11 X |
| 3,767,313 | 10/1973 | Bohoroquez | 408/14 |
| 4,111,590 | 9/1978 | Burkart | 408/14 |

FOREIGN PATENT DOCUMENTS

| | | | |
|---|---|---|---|
| 1527178 | 3/1971 | Fed. Rep. of Germany | 408/130 |
| 2442485 | 3/1975 | Fed. Rep. of Germany | 408/11 |
| 2427083 | 12/1975 | Fed. Rep. of Germany | 408/97 |
| 467793 | 5/1975 | U.S.S.R. | 408/11 |

OTHER PUBLICATIONS

Spacematic (Rec. Werkzeug GmbH, Vertiebsgesellschaft & Co., Maulbronn Germany), Technical Data Sheet.

Primary Examiner—William R. Briggs
Attorney, Agent, or Firm—James E. Bryan

[57] ABSTRACT

This invention relates to an improvement in a hand drill with a pneumatically-hydraulically controlled advance and including a housing, a drilling drive unit adapted to be powered by compressed air and being displaceably guided in said housing by a piston and cylinder, and further including hydraulic lines, and control valves, the improvement comprising a rotatable support sleeve means secured to said housing and adapted to rest on the surface of a workpiece and surround a drill bit, said piston being a double-faced hollow advance piston means mounted in said cylinder so as to divide said cylinder into two chambers, one chamber together with one face of the advance piston means being adapted to be acted on by the compressed air, and the other chamber being adapted to be filled with hydraulic fluid and pressure-loaded by the other face of the advance piston means, said latter chamber communicating through hydraulic line means and a throttling back-pressure valve means with a cylinder means having a compensating piston means therein, said cylinder means being positioned in hand grip means connected to said housing, said advance piston means on one cylinder side being adapted to displace the hydraulic fluid against said compensating piston means thus pressure-loaded until a drilling depth adjusted by a limiter means mounted on said housing is attained or until a continuously adjustable switch means mounted in a pneumatic line is deactivated, whereby the pressure acting on the compensating piston means returns the drilling drive unit together with the advance piston means to the initial position thereof.

6 Claims, 10 Drawing Figures

HAND DRILL

The invention relates to a hand drill with a pneumatically-hydraulically controlled advance, and being composed of a housing, a drilling drive unit guided therein in a displaceable manner by pistons and cylinders and being powered by compressed air, hydraulic conduits, and control valves.

Numerous means, both stationary and non-stationary for drilling and cutting holes and clearances in workpieces of various materials are known in practice, wherein the drilling component (for instance the head or drill chuck) is powered together with the drill bit, is powered electrically or pneumatically, and wherein the axial rate of advance of the tool, for instance the drill bits of a guide spindle, especially as regards pneumatically powered means, will be controlled by a piston displaceable within a cylinder arranged axially with respect to the drill bit, the piston being bilaterally loaded with compressed air and being connected by a piston rod to the head and working tool, or the advance is controlled by an integrated advance gear system. In order to obtain adjacent bores for instance, these drill means must include an additional foot-shaped centering or clamping system at their drilling part (head), the drill equipment being set down by means of this system on the workpiece into or on the previously machined bore, i.e. it will be centered or clamped. This process must be repeated prior to each new drilling. This means that on account of the continued fixing and clamping from drilling to drilling, the individual bore holes are subjected to a qualitative degradation, for instance by widening and deformation. Furthermore, the material or the workpiece used and subjected to centering or clamping on or in it must be of a minimum thickness and stiffness.

Because of this additional arrangement of a centering and clamping system at the drill means, or at its drilling component (head), the drill means becomes unwieldy for manual use due to the ensuing bulk, and it becomes heavy and costly with respect to manufacture or purchase. Because of the dimensions, such drill means, where available, can be used only in a restricted fashion and therefore are suited practically only for working on flat surfaces because the new bore is always brought down parallel to the fixation bore.

For example, German Auslegeschrift No. 1,527,178 discloses a system for controlling the advance motion of a tool mounted to a drill spindle in which the hydraulic advance can be implemented by means of a piston slider valve and with two edges controlling the compressed medium flow in two liquid passageways, where the edges are axially rigidly connected with the tool holder. That edge controlling the compressed medium flow for the return motion of the spindle is bridged by a shunt line housing a throttle valve parallel to a back pressure valve which is open in the direction of the advance drive.

Another machine tool, in particular a drilling or milling machine with a pneumatic advance for the tool is known from German Offenlegungsschrift No. 2,442,485. This machine tool comprises a piston rod equipped piston which is displaceable in a vertically mounted cylinder and which can be loaded bilaterally with compressed air, a second cylinder chamber traversed by the piston rod being provided underneath the first above, and a slider mounted in the second chamber which moves together with the piston rod. The region underneath the slider is filled with a liquid to such an extent that in the raised rest position of the piston the spacing between the lower side of the slider and the liquid level remains less than the spacing between the tool and the workpiece to be machined. The lower region of the second chamber is connected to a liquid discharge conduit including an adjustable flow valve through which flows the liquid displaced by the slider during its advance motion.

Further, a hydraulic regulator means for electric hand and spindle drills is known from German Offenlegungsschrift No. 2,427,083, with the purpose of converting any present or exerted uncontrolled compression into a precisely adjustable rate of advance, the rate however being dependent upon the force applied.

Lastly, portable drilling equipment is known, which is commercially available under the designation SPACEMATIC (REC Werkzeug Gmbh Vertriebsgesellschaft & Company, Maulbronn). These drilling machines operate on compressed air and are controlled hydraulically. They are maintained tight against the workpiece to be machined by a special automatic locking system using collets. The compressed air and hydraulic cylinders are mounted above one another and are connected to each other by concentric piston rods. The admission of compressed air into the compressed air lifter implements the advance of the cutting tool (for instance drill bit), a hydraulic capstan being used to control the advance rate by a valve-regulated oil circuit, its power output being adjustable by a screw control. Such drilling equipment can be provided with a number of various set-up or support feet in conjunction with guide means, straps and collets.

All these known drilling means or machines have the common drawback that either they lack an automatic advance and reverse of the drilling drive unit or of the drilling tool, or they are so equipped only in part, i.e., only with automatic advance, or only with automatic reverse of the drilling drive unit or of the drilling tool itself. Furthermore, their advance rate depends on the compression applied by which this drilling machine or drilling unit is pressed against the workpiece. A depth stop for the precise setting of depth of drilling or of countersinking of the bore hole is not provided. Again, all of these known drilling means must be outfitted with an additional device for set-up, centering and clamping of the drilling unit or the drilling tool on the workpiece. It is impossible to set down and set up the drilling unit or the drilling tool on the workpiece in a completely free, unsupported manner without centering holes. This frequently entails the danger of quality degradation of the bores due to torques from eccentrically applied forces by the hydraulic brake.

This being the state of the art, it is the object of the present invention to provide a hand drill by means of which qualitatively optimal drilling is achievable, which can be used universally and which is not connected to any additional devices and accessory drilling equipment. This ensures that the drillings can be made to descend vertically to the surface of the workpiece and are of proper dimensions, circular, cylindrical, and as free from burrs as possible. On the return stroke, the bore should be free of qualitative degradation. Also, it is desired to eliminate defects due to human causes and the same quality is achieved with manual drilling as with a stationary drilling means or machine. The hand drill is easily operable and requires no increased qualifications from operating personnel. Furthermore, the risk of accidents is reduced. The manufacturing cost is low and the equipment is relatively light for simple handling.

The advantages of the invention are, especially, that by mechanizing and automating the operational sequence, human inadequacies are extensively eliminated, whereby reproducibility of the drilling quality is ensured. This means that all-around improvements regarding dimensional stability, circularity, conicity and surface are achieved and, simultaneously, a reduction of the operational sequences when making reamed bores. Because the drilling advance is independent of the applied force, a desired rate of advance can be adjusted in a continuous manner. Thereby it is possible when drilling, for instance, compound fiber materials to achieve a bore exit without splintering. The individual drillings therefore can be brought down neatly, so that deburring may be eliminated. There is no hooking or pulling-in of the drill and therefore there ia also a lesser danger of overshoot. The drilling always takes place vertically to the surface of the workpiece. The drilling and countersinking depth can be predetermined by an adjustable limiter mounted to the housing of the drilling equipment in the form of a micrometer means. Together with the relatively simple and weight-saving design of the hand drill there is also a lesser requirement for the qualifications of the operator; for instance there is no danger of an accident if the drill bit should break. It is an especial advantage that only one housing is required for the various drilling drive units. This means that only the specific drive or powering unit assigned to each particular operational stage must be exchanged at the housing. Further, the foot of the hand drill may be exchanged for various applications and is mounted in a longitudinally displaceable manner to the housing, whereby it can be adapted to the length of the drill bit. The foot or a variation thereof where appropriate may be so designed that the hand drill is guided for instance in a T-slot, whereby manually applied force is eliminated. No additional equipment of any kind is required for drilling blind holes or for countersinking.

During the drilling process, the hand drill is manually pressed by means of a support sleeve with a support foot attachable to the housing of the hand drill against the surface of the workpiece into which one or more bores are to be made. The compression by which the hand drill is forced against the workpiece must exceed the axial force of the drill bit. The torque that arises is practically absorbed by the friction between the support sleeve, or the support foot, and the workpiece.

The drilling power or drive unit is mounted in the housing of the hand drill so as to be displaceable along its longitudinal axis (drill bit axis) and is pressed by compressed air loading of the rear side of the advance piston against a hydraulic fluid applied to the piston front side and acting as a brake. When the hand drill is turned on, for instance by means of a continuously adjustable switch mounted to a pistol grip, first the drilling power unit is set into rotation and upon exceeding a given switch-on path, the force on the advance piston exceeds that on the compensating piston mounted in the hand-grip, whereupon the advance is switched-on by a throttling back-pressure valve inserted in the hydraulic line. When the drilling depth set at the limiter has been reached, the drilling drive unit is automatically put back into the rest position in the fast mode. This also takes place when the load is removed from the continuously adjustable switch. Thereby, one obtains the feasibility of switching-off at any time, especially in emergencies.

Figure 2:
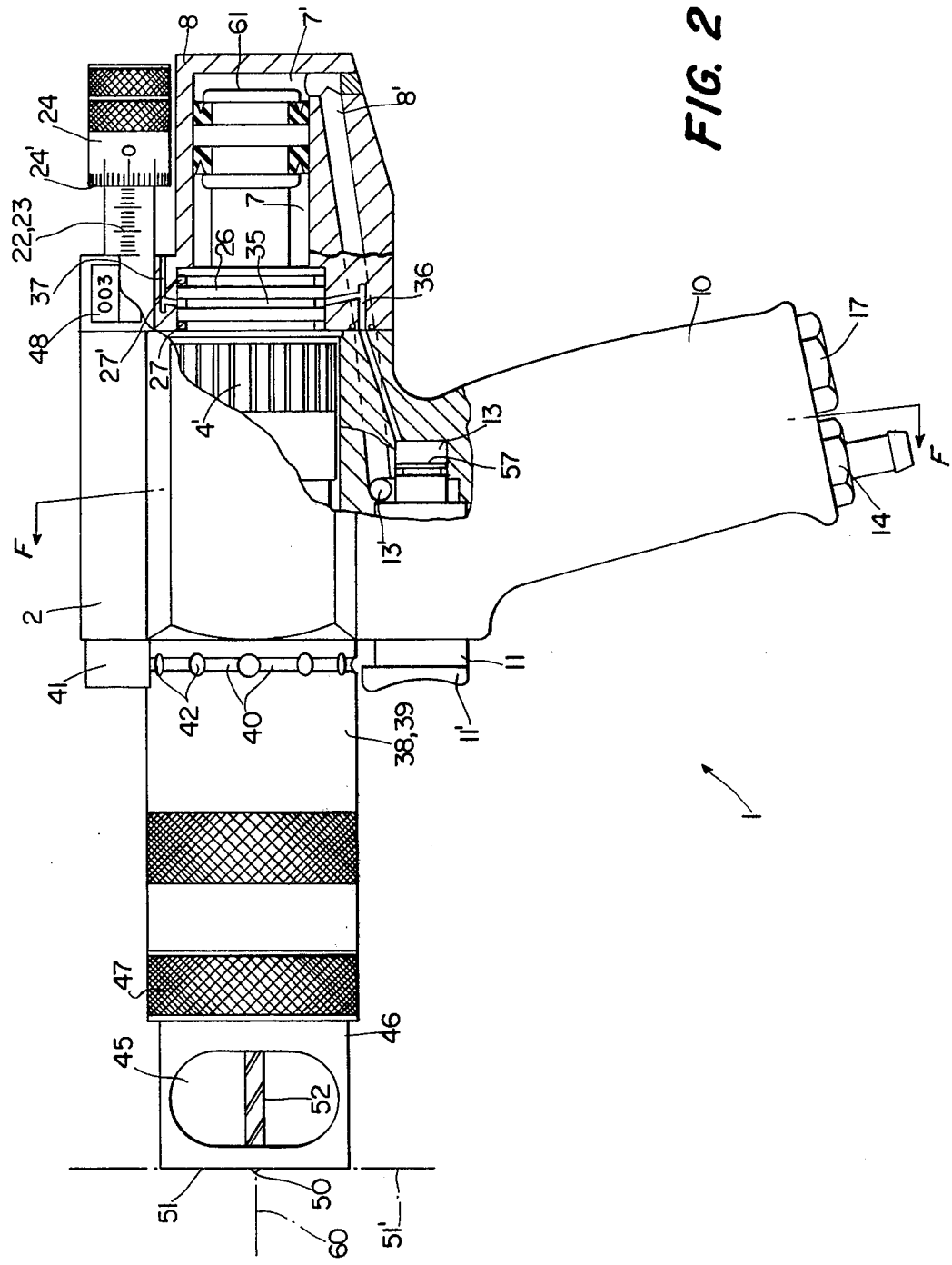
Figure 3:
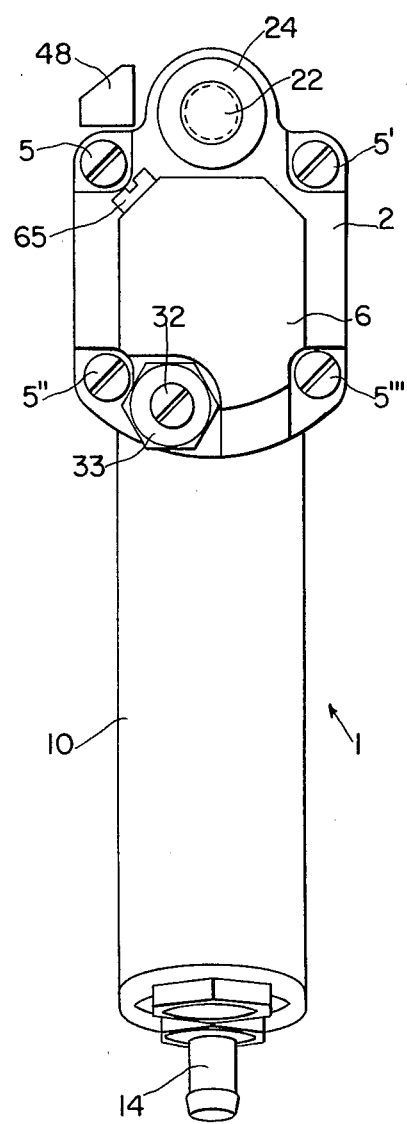
Figure 4:
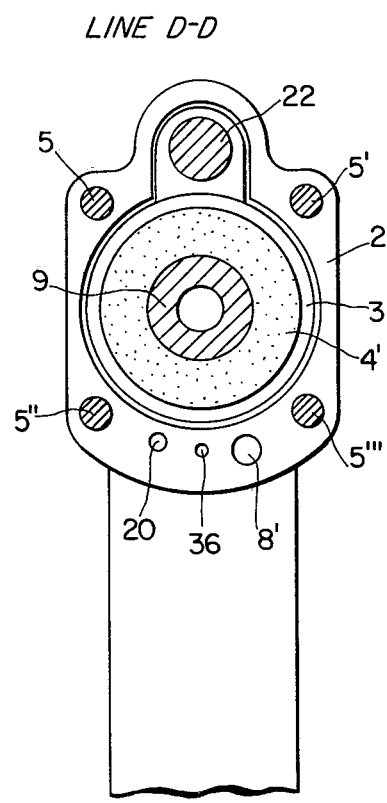
Figure 5:
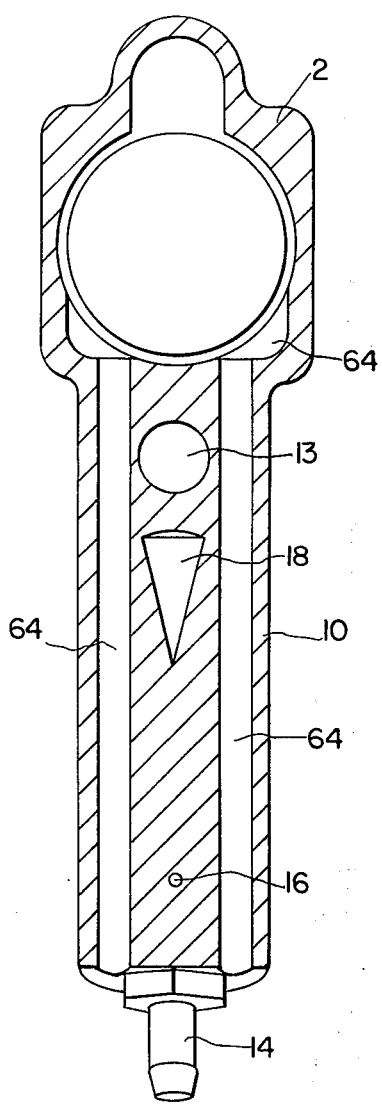
Figure 6:
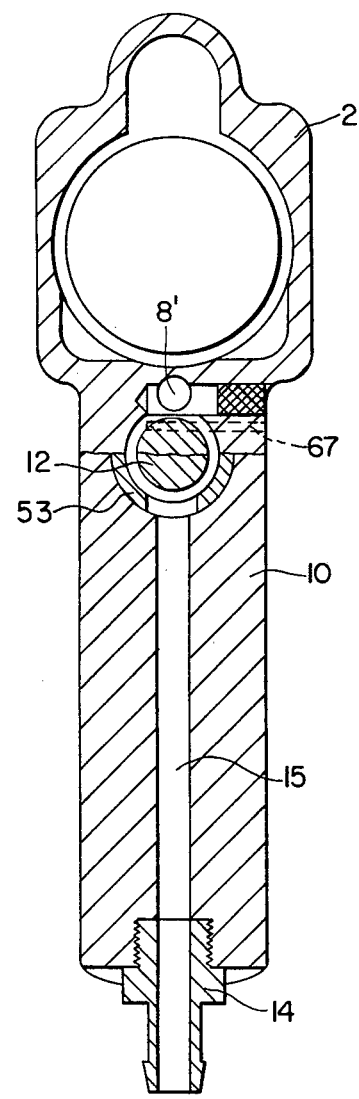
Figure 7:
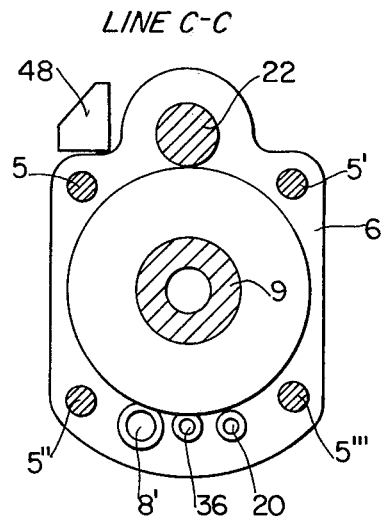
Figure 8:
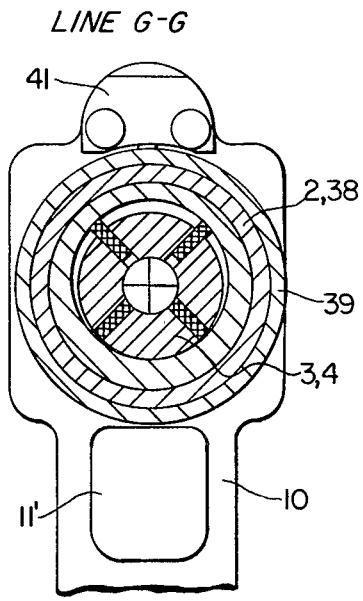
Figure 9:
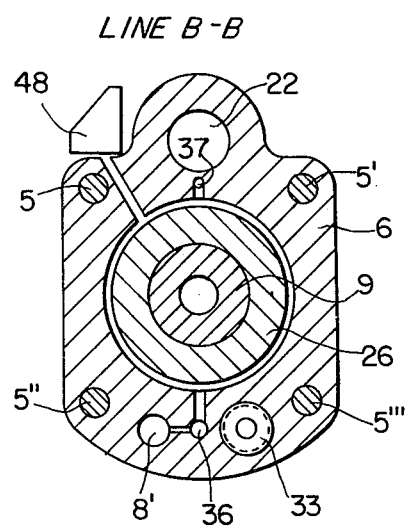
Figure 10:
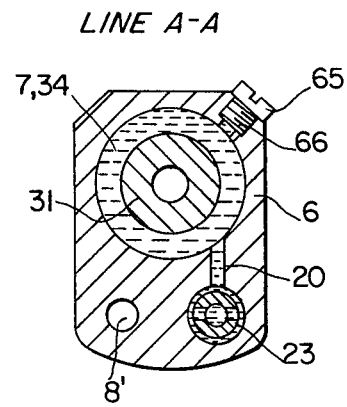

One embodiment of the drill of the present invention will be further illustrated by reference to the accompanying drawings, in which:

FIG. 1 is a longitudinal section through the hand drill,

FIG. 2 is a side view with a partial longitudinal section of the hand drill of FIG. 1, FIG. 3 is an elevation of the rear side of the drilling device of FIG. 1, FIG. 4 is section D—D through the housing of the hand drill of FIG. 1, FIG. 5 is section F—F through the housing of the drilling device of FIG. 2, FIG. 6 is section E—E through the housing of the drilling device of FIG. 1, FIG. 7 is section C—C through the housing cover of the drilling device of FIG. 2, FIG. 8 is section G—G through the housing of the drilling device of FIG. 1, FIG. 9 is section B—B through the housing cover of the drilling device of FIG. 1, and FIG. 10 is section A—A through the housing cover of the drilling device of FIG. 1.

FIGS. 1 and 2 show a complete and a partial longitudinal section, respectively, through a hand drill 1 composed of a housing 2, an exchangeable drilling drive unit 3 mounted therein in an axially displaceable manner and with a compressed-air vaned motor 4, acoustic damper 4', a housing cover 6 tightened by the screws 5, 5', 5'', 5''' (FIGS. 3, 4, 5, 9), a double-sided and hollow advance piston 9 in a cylinder 8 therein divided into two chamber halves 7, 7' and a pistol-shaped hand grip 10 mounted to the housing 2. The hand grip includes therein a continuously adjustable switch 11 with a release 11', a valve piston 12, a cylinder 13, a pneumatic line 15 issuing therein and including at the end of the hand grip 10 a connection stub 14, a cylinder 18 adjacent to the pneumatic line being connected by a bore 16 and sealed by a screw-closure 17, the cylinder 18 including a compensating piston 19, and having a hydraulic line 20 connected thereto. The cylinder 8 communicates by a channel 8' with an annular slot 13' in the switch 11 or cylinder 13 (FIG. 2). The flange 21 of the drilling unit 3, 4 is connected to and limited, due to the applied force, by a stop-guide 22 which absorbs the reaction torque of the drilling power unit 3,4. The stop-guide 22 includes at its free end a limiter 24 with graduations 24' and a micrometer screw 23, the limiter being secured against loosening by a lock nut 25. A stopper 26 is mounted in the housing cover 6 which together with the sealing rings 28, 28' set in the outer annular slots 27, 27' and with a packing ring 30 set in an inside groove 29 seals the piston rod 31 of the advance piston 9. A throttling back-pressure valve 33 mounted in the lower side of the housing cover 6 and provided with an adjustment screw 32 is placed in the hydraulic line 20 leading from the cylinder 18 with the compensating piston 19 in the hand grip 10 to the cylinder 8 in the chamber half 7 in the housing cover 6. The cylinder halves communicating by the hydraulic line 20—the chamber half 7 and the upper part of the cylinder 18—are filled with a hydraulic fluid 34. An annular groove 35 fashioned between the two outer annular slots 27, 27' at the stopper 26 communicates by a pressurized channel 36 with the cylinder 13 of the continuously adjustable switch 11 mounted in the hand grip 10 (FIG. 2). An additional channel 37 is present at the upper side of the housing cover 6 between the guide stop 22 and the stopper 26 (see also FIG. 2), which issues from the annular groove 35 into the atmosphere or, when the drilling depth predetermined by the micrometer screw with the limiter 24 has been attained, is closed by stopping against the housing 2. A support sleeve 39 with a shape and length depending upon requirements is set on the cylindrical front part 38 of the housing 2, and is axially held in position by means of a ball notch or latch system 41 fastened to the housing 2 and penetrating into an annular groove 40 in the front part 38, and which is radially held in the clearances 42 (FIG. 2).

To effect an adjustment in length, the support sleeve 39 includes an interior thread 43 into which is screwed a support foot 46 provided with an exterior thread 43 and a passageway 45, the foot being secured by a locking nut 47 (see also FIG. 2). A counter means 48 (FIGS. 2, 3, 7, 9) is mounted on the upper side of the housing 2 in the vicinity of the stop guide 22. The section lines A—A, B—B, C—C, D—D, E—E, F—F, and G—G shown in FIGS. 1 and 2 are shown as sections in the following Figures and described below:

When the hand drill 1 is started, the drill bit 52 held in a chuck 49 rigidly connected with the drilling drive unit 3 and projecting by its drill bit tip 50 out of the resting plane 51' formed by the front ring 51 of the support foot 46 is placed on a location marked by grooving or the like on a workpiece to be provided with bores. By actuating the release or trigger 11', the continuously adjustable switch 11 becomes operative. The valve piston 12 with the sealing rings 12' being displaceable axially in the cylinder 13 and in an adjoining valve sleeve 53 is moved in the process, whereby the release 11' forces a spherical pressurizing piece 54 out of the annular groove 55' fashioned in the valve sleeve 53. At the same time, an opposing pressure is generated by a compression spring 56 surrounding the valve piston 12, and stressing the release 11' in the rest position, whereby the release 11' and the valve piston 12 are pressed against each other and thus are joined. The valve piston 12 which so far was resting in the cylinder 13 and in the valve sleeve 53 both in the closed position as well as in the range up to the open position without being subjected to any axial pressure, now is displaced to the rear. Thereby, the pressure which previously was applied with simultaneous effectiveness against the two equally large piston surfaces 57, 57' and in channel 8' (FIG. 2) as far as the chamber half 7' of the cylinder 8 now undergoes a change in the form of a reinforcement in favor of the chamber half 7'. This change in pressure is achieved by means of compressed air supplied by the pneumatic line 15 and fed through a (not shown) compressed air line connected to the junction stub 14, the compressed air flowing through the annular slot 13' and the channel 8' (FIG. 2) into the chamber half 7'. The compressed air in the cylinder 13 escapes during the time of switch-on and of displacing the valve piston 12 through the statically pressurized channel 36 (FIG. 2), the annular groove 35 and channel 37 to the atmosphere. A stop pin 59 extending from the hand grip 10 into a groove 58 of the switch 11 is used as a stop and as a means preventing rotation for the release 11'.

The actuation of the release 11' or of the switch 11 takes place appropriately when starting the hand drill 1 by means of a careful slight pull. Thereby the compressed air flows slowly into the chamber half 7' and at the same time through the hollow advance piston 9 and sets the compressed-air vaned motor 4 into a slight rotation, i.e., the drilling power unit 3 with drill bit 52. Thereby the drill bit tip 50 slowly penetrates the premarked material. Inaccurate start of drilling is avoided thereby because the support foot 46 rests completely against the workpiece and because the drilling axis 60 of the drill bit 52, i.e., of the hand drill 1, is aligned at a right angle to the drilling surface. After the initial drilling so achieved on the surface of the workpiece, the release 11' is fully pulled as far as the stop pin 59, whereby the way for the full flow of the compressed air against the annular surface of the advance piston 9 and the compressed air vaned motor 4 is clear and a constant pressure then is effected. This pressure acts on the advance piston 9 as a constant advance force and effects an automatic advance of the drilling drive unit 3 and simultaneously results in the unit attaining its full angular speed. The line 15 and the cylinder 18 with the compensating piston 19 adjoining each other in hand grip 10 spatially communicate with each other by bore 16 through which the compressed air in line 15 flows into the cylinder 18. Accordingly, there is constant pressure balance between both chambers. The compressed air now also in cylinder 18 constantly presses against the surface facing it of the compensating piston 19 of which the surface 63, which is away from surface 62, presses against the hydraulic fluid 34. Both media, the compressed air and the hydraulic fluid, are mutually separated by the sealing rings 19' mounted to the compensating piston 19.

When actuating the release 11' and switch 11, compressed air is passed through the channel 8' (FIG. 2) and acts against the advance piston 9 (and vaned motor 4), thereby moving the piston while at the same time forcing the hydraulic fluid 34 out of the chamber half 7 in the direction of the drilling axis 60. Accordingly, the displaced quantity of hydraulic fluid 34, which is controlled by the throttling back-pressure valve 33 in the hydraulic line 20 between the chamber half 7 and the cylinder 18, flows back into the cylinder 18. The back flow of the hydraulic fluid 34 is a measure of the rate of advance of the drilling power unit 3 and can be adjusted or controlled by the adjustment screw 32 mounted in the throttling back-pressure valve 33. If the drilling process is interrupted by releasing the release 11, there then will be a reversal of the pressure and flow conditions. The compressed air fed to the advance piston 9 is interrupted in the switch 11 and at the same time the air forces the compensating piston 19 against the oppositely located column of the hydraulic fluid 34 which, controlled by the throttling back-pressure valve 33, flows back into the chamber half 7 and presses the advance piston 9 back into its rest position. The same process occurs when the drilling is terminated, i.e. when a bore is finished. In this case the return-guidance of the drilling drive unit 3 is achieved not by merely releasing the release 11', but rather by the flange 21 together with its guide 22 and micrometer screw or limiter 24 or its surface 24' being set against the housing 2. Thereby, the opening of the channel 37 leading to the atmosphere will be closed and the discharge of the previously exhausted compressed air will be interrupted. The pressure of the compressed air so dammed up in the channel 37, in the annular groove 35, in the static pressure channel 36 and the cylinder 13 forces the valve piston 12 in the switch 11 back into its initial position, so that the channel 8' is closed. This is implemented by unlatching the ball pressure piece 54 out of the annular groove 55 for depressed release 11', the path of the valve piston 12 being limited by a stop 67.

The stroke of the drilling drive unit 3, i.e. the drilling depth, can be adjusted by means of the graduations on the micrometer screw 23 and its limiter 24.

The return guidance of the drilling drive unit 3 in both cases takes place spontaneously in the fast mode. After the drilling process is completed, i.e. after the return setting of the drilling drive unit 3, the ball pressure piece 54 again latches into the annular groove 55 and thereby implements the form-locking connection with the release 11', or the switch 11.

The compressed air discharged during the operation of the drilling drive unit 3 flows through the acoustic damper 4' and two discharge channels 64 mounted in the hand grip 10 into the atmosphere (FIG. 5).

The automatic fast-mode return stroke of the drilling drive unit 3 ensures that the hand drill 1 remains in its initial position at the workpiece and that the drill bit 52 will be guided back centrally out of the bore hole made therein. Canting of the drill bit and a resulting reduction in bore hole quality is practically eliminated thereby.

The counter 48 (FIGS. 2, 3, 7 and 9) mounted to the housing 2 and connected for instance by a drive arm with the stop guide 22 permits counting the boreholes made.

FIG. 3 shows a rear view of the hand drill 1. The housing 2 with the hand grip 10 and junction stub 14 is sealed by the housing cover 6 by means of the screws 5, 5', 5", 5'''. The adjusting screw 32 (FIG. 1) mounted to the throttling back-pressure valve 33 is located at the lower part of housing 2. A bore hole 66 (FIG. 10) sealed by a closure screw 65 is located at the upper left beveled side of the housing cover 6, which is used for filling the chamber half 7 with hydraulic fluid 34 (FIGS. 1 and 2) and for ventilation thereof. The stop guide 22 with the micrometer screw 23 and limiter 24 is mounted to the rear side of the housing 2 and above the housing cover 6, and beside the counter 48 (FIGS. 1 and 2).

FIG. 4 shows the section D—D from FIG. 1 through the housing 2, with the bore holes made visible and the screws 5, 5', 5", 5''', the stop guide 22, the acoustical damper 4', the drilling drive unit 3, the hollow advance piston 9, the hydraulic line 20, the static pressurized channel 36, and the channel 8'.

FIG. 5 shows the section F—F of FIG. 2 through the housing 2 and the hand grip 10 with the junction piece 14. The compressed air applied from the acoustic damper 4' (FIGS. 1 and 2) to the space surrounding it of housing 2 flows through the exhaust channels 64 provided in the hand grip 10 into the atmosphere. The cylinders 13 and 18 and the bore hole 16 (FIGS. 1 and 2) are located in between.

FIG. 6 shows the section E—E of FIG. 1 through the housing 2, the valve piston 12 with the channel 8', the stop 67, the valve sleeve 53 and hand grip 10 with the pneumatic line 15 and the junction stub 14 connected thereto.

FIG. 7 shows the section C—C of FIG. 2 through the housing cover 6 with the stop guide 22, the bore holes and screws 5, 5', 5", 5''', the advance piston 9, the channels 8' and 36, the hydraulic line 20, and the counter 48.

FIG. 8 shows the section G—G of FIG. 1 through the housing 2 or the cylindrical front part 38, the support sleeve 39 and the drilling drive unit 3 with the vaned motor 4, and an elevation of the hand grip 10, the release 11', and the ball latch 41.

FIG. 9 shows the section B—B of FIG. 1 through the housing cover 6 with the bore holes and screws 5, 5', 5", 5''', the stop guide 22, the counter 48, the advance piston 9, the stopper 26, the channel 8', the statically pressurized channel 36 with connection, and the throttling back-pressure valve 33.

FIG. 10 shows the section A—A of FIG. 1 through the housing cover 6 with the bore hole 66 and the sealing screw 65, the chamber half 7 with the hydraulic fluid 34, the hollow piston rod 31, the channel 8', and the throttling back pressure valve 33 with the hydraulic line 20.

It will be obvious to those skilled in the art that many modifications may be made within the scope of the present invention without departing from the spirit thereof, and the invention includes all such modifications.

What is claimed is:

1. In a hand drill with a pneumatically-hydraulically controlled advance and including a housing, a drilling drive unit adapted to be powered by compressed air and being displaceably guided in said housing by a piston and cylinder, and further including hydraulic lines, and control valves, the improvement which comprises a rotatable support sleeve means secured to said housing and adapted to rest on the surface of a workpiece and surround a drill bit, said piston being a double-faced hollow advance piston means mounted in said cylinder so as to divide said cylinder into two chambers, one chamber together with one face of the advance piston means being connected by conduit means to be acted on by the compressed air, and the other chamber being adapted to be filled with hydraulic fluid and pressure-loaded by the other face of the advance piston means, said other chamber communicating through hydraulic line means and a throttling back-pressure valve means with a cylinder means having a compensating piston means therein dividing said cylinder means into two chambers, one chamber together with one face of the compensating piston means being adapted to be acted on by the hydraulic fluid, and the other chamber together with the other face of the compensating piston means being connected by a pneumatic line to be acted on by the compressed air, said cylinder means being positioned in hand grip means connected to said housing, said advance piston means on one cylinder side being adapted to displace the hydraulic fluid against said compensating piston means thus pressure-loaded until a drilling depth adjusted by a limiter means mounted on said housing is attained or until a continuously adjustable switch means mounted in said pneumatic line is deactivated, said continuously adjustable switch means being adapted to be manually actuated, being turned off automatically by pneumatic control pressure independently of manual actuation when the desired depth of drilling is attained and including a manually actuated release means and a valve piston means, said release means and valve piston means being held together by force applied until the valve piston means overcomes the control pressure built up by a limiter means and resistance of a ball latching means for the actuated release means, and returns to a closed position determined by stop means, whereby the pressure acting on the compensating piston means returns the drilling drive unit together with the advance piston means to the initial position thereof.

2. A hand drill according to claim 1 in which the limiter means is an adjustable stop.

3. A hand drill according to claim 2 in which said limiter means automatically seals statically pressurized channels connected to the continuously adjustable switch means.

4. A hand drill according to claim 3 in which said limiter means has fine adjustment means.

5. A hand drill according to claim 4 including means whereby the rate of advance of the drilling drive unit can be controlled by the throttling back-pressure valve means.

6. A hand drill according to claim 5 including means whereby the rate of advance of the drilling drive unit can be controlled by reducing the pressure on the compensating piston means.

* * * * *